United States Patent
Ma et al.

(10) Patent No.: US 10,152,644 B2
(45) Date of Patent: Dec. 11, 2018

(54) PROGRESSIVE VEHICLE SEARCHING METHOD AND DEVICE

(71) Applicant: BEIJING UNIVERSITY OF POSTS AND TELECOMMUNICATIONS, Beijing (CN)

(72) Inventors: Huadong Ma, Beijing (CN); Wu Liu, Beijing (CN); Xinchen Liu, Beijing (CN); Haitao Zhang, Beijing (CN); Huiyuan Fu, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 80 days.

(21) Appl. No.: 15/350,813

(22) Filed: Nov. 14, 2016

(65) Prior Publication Data
US 2018/0060684 A1 Mar. 1, 2018

(30) Foreign Application Priority Data
Aug. 31, 2016 (CN) .......................... 2016 1 0798016

(51) Int. Cl.
*G06K 9/32* (2006.01)
*G06K 9/00* (2006.01)
(Continued)

(52) U.S. Cl.
CPC ....... *G06K 9/325* (2013.01); *G06F 17/30253* (2013.01); *G06F 17/30256* (2013.01); *G06K 9/00771* (2013.01); *G06K 9/6215* (2013.01)

(58) Field of Classification Search
None
See application file for complete search history.

(56) References Cited

U.S. PATENT DOCUMENTS 9,367,763 B1 * 6/2016 Gordo Soldevila ... G06K 9/325
9,465,997 B2 * 10/2016 Tu ....................... G06K 9/00771
(Continued)

FOREIGN PATENT DOCUMENTS

CN 103714349 A * 4/2014
CN 105205489 A * 12/2015

OTHER PUBLICATIONS

Kwaśnicka, Halina, and Bartosz Wawrzyniak. "License plate localization and recognition in camera pictures." 3rd Symposium on Methods of Artificial Intelligence. 2002. APA.*
(Continued)

*Primary Examiner* — Michelle M Entezari
(74) *Attorney, Agent, or Firm* — Mark E. Bandy; Rankin, Hill & Clark LLP

(57) ABSTRACT

The present application discloses a vehicle searching method and device, which can perform the steps of: calculating an appearance similarity distance between a first image of a target vehicle and several second images containing the searched vehicle; selecting several images from the several second images as several third images; obtaining corresponding license plate features of license plate areas in the first image and each of the third images with a preset Siamese neural network model; calculating a license plate feature similarity distance between the first image and each of the third images according to license plate feature; calculating a visual similarity distance between the first image and each of the third images according to the appearance similarity distance and the license plate feature similarity distance; obtaining a the first search result of the target vehicle by arranging the several third images in an ascending order of the visual similarity distances. The solution provided by the present application is not limited by application scenes, and it also improves vehicle searching speed and accuracy while reducing requirements of hardware such (Continued)

as cameras that collect images of a vehicle and auxiliary devices.

10 Claims, 8 Drawing Sheets

(51) Int. Cl.
  *G06K 9/62* (2006.01)
  *G06F 17/30* (2006.01)

(56) References Cited

U.S. PATENT DOCUMENTS

| | | | | |
|---|---|---|---|---|
| 9,606,975 | B2* | 3/2017 | Oh | G06F 17/241 |
| 9,786,084 | B1* | 10/2017 | Bhat | G06T 7/11 |
| 2005/0084154 | A1* | 4/2005 | Li | G06K 9/4652 |
| | | | | 382/190 |
| 2005/0196016 | A1* | 9/2005 | Sato | G06K 9/3241 |
| | | | | 382/103 |
| 2013/0050492 | A1* | 2/2013 | Lehning | G06K 9/00785 |
| | | | | 348/148 |
| 2014/0363052 | A1* | 12/2014 | Kozitsky | G06K 9/00624 |
| | | | | 382/105 |
| 2015/0104073 | A1* | 4/2015 | Rodriguez-Serrano | |
| | | | | G06K 9/3258 |
| | | | | 382/105 |
| 2016/0189003 | A1* | 6/2016 | Liu | G06K 9/6215 |
| | | | | 382/155 |

OTHER PUBLICATIONS

Ghiassirad, Hosseinali, and Mohammad Teshnehlab. "Similarity measurement in convolutional space." Intelligent Systems (IS), 2012 6th IEEE International Conference. IEEE, 2012. APA.*
Machine Translation of CN 105205489 A (Year: 2015).*
Machine Translation of CN 103714349 A (Year: 2014).*
Jiang X, Huang YD, Li GQ. Fusion of texture features and color information of the license plate location algorithm. InWavelet Analysis and Pattern Recognition (ICWAPR), 2012 International Conference on Jul. 15, 2012 (pp. 15-19). IEEE. (Year: 2012).*
Tan C, Cao J. An Algorithm for License Plate Location Based on Color and Texture. InIntelligent Human-Machine Systems and Cybernetics (IHMSC), 2013 5th International Conference on Aug. 26, 2013 (vol. 2, pp. 356-359). IEEE. (Year: 2013).*
Zhangfan, Cheng, and Chen Rongbao. "License plate location method based on modified HSI model of color image." In Electronic Measurement & Instruments, 2009. ICEMI'09. 9th International Conference on, pp. 4-197. IEEE, 2009. (Year: 2009).*
Wu, Y., Liu, S. and Wang, X., 2013, May. License plate location method based on texture and color. In Software Engineering and Service Science (ICSESS), 2013 4th IEEE International Conference on (pp. 361-364). IEEE. (Year: 2013).*
Deb, Kaushik, Muhammad Kamal Hossen, Muhammad Ibrahim Khan, and Mohammad Rafiqul Alam. "Bangladeshi vehicle license plate detection method based on HSI color model and geometrical properties." In Strategic Technology (IFOST), 2012 7th International Forum on, pp. 1-5. IEEE, 2012. (Year: 2012).*
Li, Li, and Feng Guangli. "The license plate recognition system based on Fuzzy theory and BP neural network." In Intelligent Computation Technology and Automation (ICICTA), 2011 International Conference on, vol. 1, pp. 267-271. IEEE, 2011. (Year: 2011).*
Wang, Feng, Dexian Zhang, Lichun Man, and Junwei Yu. "A Naive Bayesian approach for color recognition of license plates." In Intelligent Control and Information Processing (ICICIP), 2010 International Conference on, pp. 154-159. IEEE, 2010. (Year: 2010).*
Kim Ki, Jung K, Kim JH. Color texture-based object detection: an application to license plate localization. InPattern Recognition with Support Vector Machines 2002 (pp. 293-309). Springer, Berlin, Heidelberg. (Year: 2002).*

* cited by examiner

PROGRESSIVE VEHICLE SEARCHING METHOD AND DEVICE

TECHNICAL FIELD

The present application relates to the technical field of vehicle searching, and particularly to a vehicle searching method and device.

BACKGROUND

Vehicle searching (also known as vehicle re-identification) refers to searching, given an image of a target vehicle, a vehicle monitoring image database for vehicle images that are similar to a image of a target vehicle according to visual features and time-space information of the image of the target vehicle and the like, and arranging the similar vehicle images found in an ascending order of the similarity.

Vehicle searching has very important application value in urban traffic control, such as traffic violation management, traffic flow statistics, urban management and so on.

Currently, there are mainly two types of vehicle searching methods. The first type of vehicle searching method is a vehicle searching method based on license plate recognition at accesses in constrained scenes, wherein target vehicle searching is realized mainly by comparing images of the target vehicle with all images in a vehicle monitoring image database according to the license plate information to obtain similarity therebetween. This method requires to detect and acquire vehicle images containing license plate information in the scenes in which the license plate images can be collected conveniently, such as accesses of roads and parking lot, road intersections, and to acquire license plate information in the vehicle images using license plate recognition technology. The second type of vehicle searching method is a similar vehicle searching method based on vehicle appearance features in unconstrained scenes. In the similar vehicle searching method, target vehicle searching is realized mainly by comparing an image of a target vehicle with all images in a vehicle monitoring image database according to the appearance visual features of a vehicle to obtain similarity therebetween, the appearance visual features of a vehicle including color, shape, size, texture and other information.

Although the first method can improve the accuracy of vehicle searching, it is limited to a license plate information recognition system, and is only adapted to constrained scenes, such as accesses of roads and parking lot, road intersections and the like, but is not adapted to unconstrained scenes. Moreover, license plate information recognition has a relatively low efficiency in large-scale video surveillance scenes, and imposes higher requirements on hardware such as cameras that collect images of a vehicle and auxiliary devices. The second method has no constraint on application scenes; however, the accuracy of searching a target vehicle is reduced.

In view of above, there is an urgent need for a vehicle searching method that is not limited by application scenes while improving searching accuracy and searching speed.

SUMMARY OF INVENTION

Embodiments of the present application aim to provide a vehicle searching method, so as to broaden the application range of the vehicle searching application scene while improving the speed and accuracy of vehicle searching.

To achieve the above objectives, embodiments of the present application provide a vehicle searching method, which comprises:

obtaining a first image of a target vehicle;

extracting a first appearance visual feature of the target vehicle from the first image;

extracting a second appearance visual feature of the searched vehicle respectively from several second images; wherein, the second images are the images stored in a vehicle monitoring image database;

calculating an appearance similarity distance between the first image and each of the second images according to the first appearance visual feature and each of the second appearance visual features;

selecting several images from the several second images as several third images;

determining a first license plate area in the first image and a second license plate area in each of the third images;

obtaining a first license plate feature corresponding to the first license plate area and a second license plate feature corresponding to each of the second license plate areas by inputting the first license plate area and each of the second license plate areas respectively into a preset Siamese neural network model;

calculating a license plate feature similarity distance between the first image and each of the third images according to the first license plate feature and each of the second license plate features;

calculating a visual similarity distance between the first image and each of the third images according to the appearance similarity distance and the license plate feature similarity distance;

obtaining a first search result of the target vehicle by arranging the several third images in an ascending order of the visual similarity distances.

Preferably, the step of selecting several images from the several second images as several third images comprises:

obtaining a second search result of the target vehicle by arranging the several second images in an ascending order of the appearance similarity distances;

determining several images that rank before a first threshold value in the second search result as the several third images.

Preferably, after the step of calculating a visual similarity distance between the first image and each of the third images, the method further comprises:

calculating time-space similarity between the first image and each of the third images according to time-space meta data contained in the first image and each of the third images;

calculating a final similarity distance between the first image and each of the third images according to the visual similarity distance and the time-space similarity;

obtaining a third search result of the target vehicle by arranging the several third images in an ascending order of the final similarity distances.

Preferably, the method further comprises:

determining several images that rank before a second threshold value in the second search result as several fourth images;

calculating time-space similarity between the first image and each of the fourth images according to time-space meta data contained in the first image and each of the fourth images;

calculating a final similarity distance between the first image and each of the fourth images according to the visual similarity distance and the time-space similarity;

obtaining a fourth search result of the target vehicle by arranging the several fourth images in an ascending order of the final similarity distances.

Preferably, the step of calculating time-space similarity between the first image and each of the third images comprises:

calculating the time-space similarity between the first image and each of the third images with a first preset model, wherein, the first preset model is:

$$ST(i, j) = \frac{|T_i - T_j|}{T_{max}} \times \frac{\delta(C_i, C_j)}{D_{max}},$$

wherein, ST (i, j) is the time-space similarity, $T_i$ is the shooting time at which the first image is taken, $T_j$ is the shooting time at which the third image is taken, $\delta(C_i, C_j)$ is the distance between a camera $C_i$ taking the first image and a camera $C_j$ taking the third images, $T_{max}$ is the maximum value of absolute values of the differences between the time at which the first image is taken and the time at which all of the several third images are taken, $D_{max}$ is the maximum value of distances between the camera taking the first image and the cameras taking each of the third images.

Preferably, the step of calculating a final similarity distance between the first image and each of the third images comprises:

calculating the final similarity distance between the first image and each of the third images with a second preset model, wherein, the second preset model is:

$D = D_{visual} \times ST(i, j)$, wherein, D is the final similarity distance, $D_{visual}$ is the visual similarity distance.

Preferably, the first appearance visual feature comprises a first texture feature, a first color feature and a first semantic attribute feature;

the second appearance visual feature comprises a second texture feature, a second color feature and a second semantic attribute feature;

the step of calculating an appearance similarity distance between the first image and each of the second images according to the first appearance visual feature and each of the second appearance visual features, comprises:

performing the following steps for the first image and each of the second images respectively:

calculating a texture similarity distance according to the first texture feature and the second texture feature;

calculating a color similarity distance according to the first color feature and the second color feature;

calculating a semantic attribute similarity distance according to the first semantic attribute feature and the second semantic attribute feature;

calculating the appearance similarity distance between the first image and the second image according to the texture similarity distance, the color similarity distance, the semantic attribute similarity distance and a third preset model; wherein, the third preset model is:

$D_{appearance} = \alpha \times d_{texture} \beta \times d_{color} + (1 - \alpha - \beta) \times d_{attribute}$, wherein, $D_{appearance}$ is the appearance similarity distance, $d_{texture}$ is the texture similarity distance, $d_{color}$ is the color similarity distance, $d_{attribute}$ is the semantic attribute similarity distance, $\alpha$ and $\beta$ are empirical weights.

Preferably, the step of calculating a visual similarity distance between the first image and each of the third images comprises:

calculating the visual similarity distance between the first image and each of the third images with a fifth preset model, wherein, the fifth preset model is:

$D_{visual} = \gamma \times D_{appearance} + (1 - \gamma) \times D_{plate}$, wherein, $D_{visual}$ is the visual similarity distance, $D_{appearance}$ is the appearance similarity distance, $D_{plate}$ is the license plate feature similarity distance, $\gamma$ is an empirical weight.

Embodiments of the present application further provide a vehicle searching device, which comprises a processor, coupled to a memory, that executes or facilitates execution of executable modules, the executable modules comprising:

a first image obtaining module for obtaining a first image of a target vehicle;

a first appearance feature extracting module for extracting a first appearance visual feature of the target vehicle from the first image;

a second appearance feature extracting module, for extracting a second appearance visual feature of the searched vehicle respectively from several second images; wherein, the second images are the images stored in a vehicle monitoring image database;

a first calculating module, for calculating an appearance similarity distance between the first image and each of the second images according to the first appearance visual feature and each of the second appearance visual features;

a first selecting module for selecting several images from the several second images as several third images;

a license plate area determining module, for determining a first license plate area in the first image and a second license plate area in each of the third images;

a license plate feature obtaining module, for obtaining a first license plate feature corresponding to the first license plate area and a second license plate feature corresponding to each of the second license plate areas by inputting the first license plate area and each of the second license plate areas respectively into a preset Siamese neural network model;

a second calculating module, for calculating a license plate feature similarity distance between the first image and each of the third images according to the first license plate feature and each of the second license plate features;

a third calculating module, for calculating a visual similarity distance between the first image and each of the third images according to the appearance similarity distance and the license plate feature similarity distance;

a first search result obtaining module, for obtaining a first search result of the target vehicle by arranging the several third images in an ascending order of the visual similarity distances.

Preferably, the executable modules further comprise:

a fourth calculating module, for calculating, after the third calculating module is triggered, time-space similarity between the first image and each of the third images according to time-space meta data contained in the first image and each of the third images;

a fifth calculating module, for calculating a final similarity distance between the first image and each of the third images according to the visual similarity distance and the time-space similarity;

a third search result obtaining module, for obtaining a third search result of the target vehicle by arranging the several third images in an ascending order of the final similarity distances.

The vehicle searching method and device provided by the embodiments of the present application can extract a first appearance visual feature of a target vehicle from a first image of the target vehicle; extracting a second appearance visual feature of the searched vehicle respectively from several second images; calculating an appearance similarity distance between the first image and each of the second images according to the first appearance visual feature and each of the second appearance visual features; selecting several images from the several second images as several third images; determining a first license plate area in the first image and a second license plate area in each of the third images; obtaining a first license plate feature corresponding to the first license plate area and a second license plate feature corresponding to each of the second license plate areas by inputting the first license plate area and each of the second license plate areas respectively into a preset Siamese neural network model; calculating a license plate feature similarity distance between the first image and each of the third images according to the first license plate feature and each of the second license plate features; calculating a visual similarity distance between the first image and each of the third images according to the appearance similarity distance and the license plate feature similarity distance; obtaining a first search result of the target vehicle by arranging the several third images in an ascending order of the visual similarity distances. In the methods and devices provided by the present application, on one hand, the license plate features corresponding to the first image and each of second images are determined with the Siamese neural network model, instead of a traditional license plate recognition method, such that the vehicle searching method provided by the present application is not limited to application scenes while improving vehicle searching speed and reducing requirements of hardware such as cameras that collect images of a vehicle in the meantime and auxiliary devices. On the other hand, the visual similarity distance between the first image and each of the second images is comprehensively determined according to two parameters, i.e., the appearance similarity distance and license plate feature similarity distance, such that a higher searching accuracy of the vehicle searching method provided by the present application is ensured. Of course, any product or method implementing the present application does not necessarily achieve all the advantages described above at the same time.

BRIEF DESCRIPTION OF THE DRAWINGS

In order to describe the technical solutions in the embodiments of the present application or in the prior art more clearly, appended drawings required for describing the embodiments of the present application or the prior art will be briefly described below. Obviously, the appended drawings described below are only some embodiments of the present application, and those skilled in the art can obtain other drawings based on these drawings without any creative effort.

DETAILED DESCRIPTION OF THE INVENTION

Technical solutions in the embodiments of the present application will be described below clearly and completely in combination with the appended drawings of the embodiments of the present application. Obviously, the described embodiments are only some of the embodiments of the present application, rather than all of the embodiments. Any other embodiment obtained based on the embodiments of the present application by those skilled in the art without doing creative works falls into the protection scope of the present application.

In order to broaden the application range of the vehicle searching application scenes and to improve the speed and accuracy of vehicle searching, the embodiments of the present application provide a vehicle searching method and device, which are applicable to an electronic device. One vehicle searching method will be firstly described below.

Embodiment 1

Figure 1:
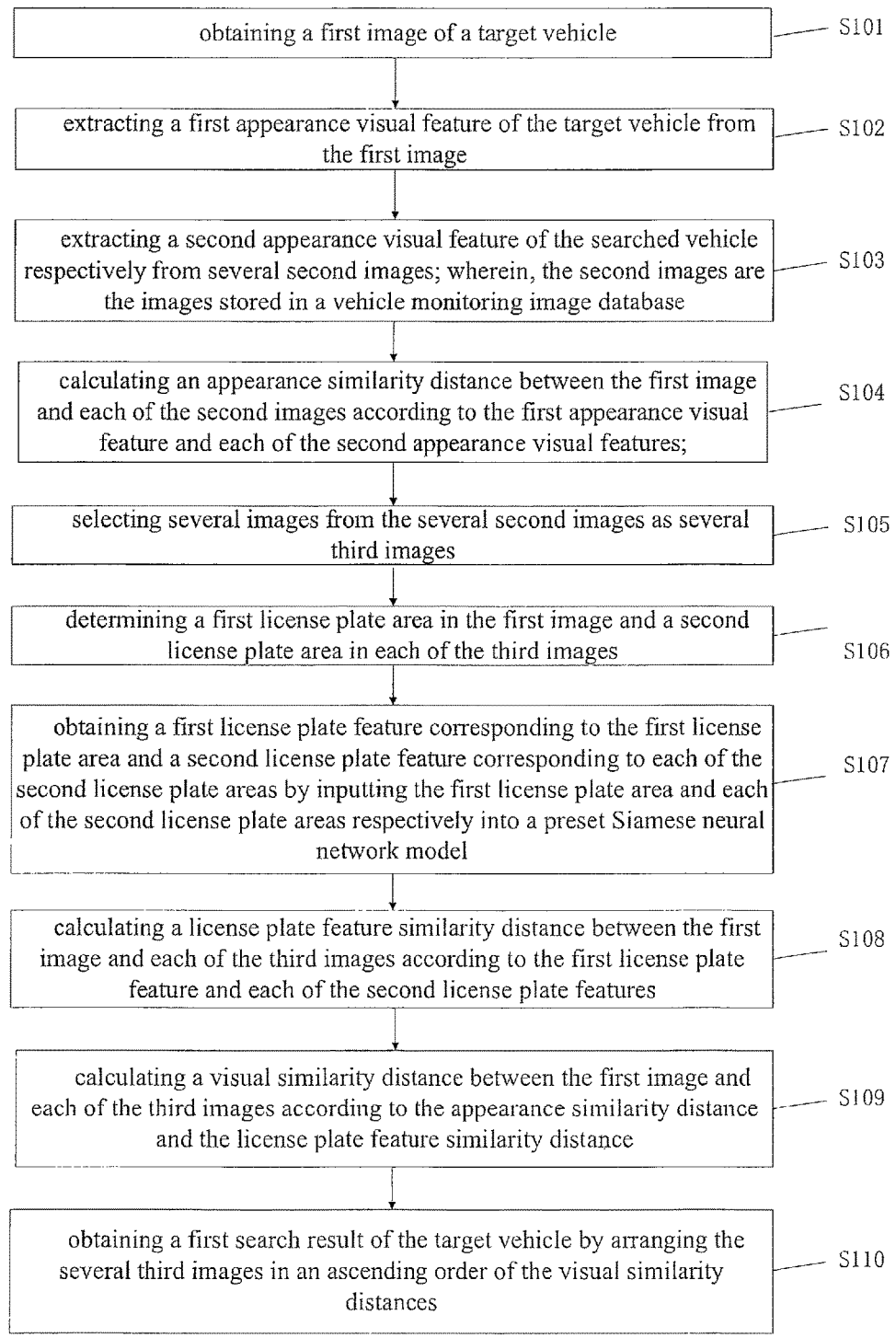
FIG. 1 is a flowchart of a vehicle searching method provided by the first embodiment of the present application.

As shown in FIG. 1, a vehicle searching method provided by the first embodiment of the present application comprises the following steps:

S101, obtaining a first image of a target vehicle;

The first image of a target vehicle can conic from a surveillance video, or can be obtained by taking pictures.

It should be noted that the license plate area of the target vehicle must be contained in the first image of the target vehicle so as to carry out the subsequent extraction and comparison of license plate features.

S102, extracting a first appearance visual feature of the target vehicle from the first image;

Since the first appearance visual feature is directed to the target vehicle in the first image, therefore, the target vehicle area should be detected from the first image before executing step S102.

In particular, the method of determining a target vehicle area in a first image belongs to the prior art. For example, object detection algorithm based on Fast Region-based Convolutional Neural Networks (briefly referred to as Fast RCNN detection algorithm) can be used to retrieve a target vehicle area from the first image, and thus will not be described in detail here.

Wherein, the first appearance visual features mainly comprise a first texture feature, a first color feature and a first semantic attribute feature. The extraction of a first appearance visual feature from a first image refers to the extraction of a first texture feature, a first color feature and a first semantic attribute feature from a first image respectively.

Specific methods of extracting these three features from a first image will be described hereinafter. It can be understood that the methods of extracting these three features described below are only illustrative but not unique, any method capable of extracting these features is applicable to the present application.

(1) A Method of Extracting a First Texture Feature

The present application adopts an ORB extraction method to extract all the local feature points of a target vehicle in a first image and then utilizes a Bag of Words (BoW) model to quantify the local feature points of the target vehicle, so as to obtain a first texture feature vector of the first image and use the first texture feature vector to represent the first texture feature. Detailed steps are as follows.

Step 1: training the codebook for a bag of texture words

Firstly, an image set $T=\{I_i\}_N$ of a training vehicle is given, wherein, N is the number of images of the training vehicle in the image set T of the training vehicle, $I_i$ represents an image of the training vehicle in the image set T of the training vehicle. The local feature points of each of images $I_i$ of the training vehicle in the image set of the training vehicle are extracted and make up a training feature point set $P_T$.

Secondly, all the training feature points in $P_T$ are clustered into $K_1$ classes by a k-means cluster algorithm according to a preset codebook size $K_1$, $K_1$ cluster centers obtained after clustering are $K_1$ texture visual words $w_{ti}$, the set constituted by the $K_1$ texture visual words $w_{ti}$ is the codebook $C_1=\{w_{ti}\}_{K_1}$ of the bag of texture words, wherein $K_1=10000$ is set in the present application.

Finally, the weight of an Inverse Document Frequency (IDF) of each texture visual word $w_{ti}$ is calculated, and the specific formula is as follows:

$$IDF_{w_{ti}} = \log\frac{|T|}{|j: w_{ti} \in I_j|},$$

wherein, $|T|$ is the size of an image set T of a training vehicle, $|j: w_{ti} \in I_j|$ represents the number of images of the training vehicle containing a texture visual word $w_{ti}$.

Step 2. Extracting A First Texture Feature From The First Image

Firstly, all the local feature points of the target vehicle in the first image are extracted and a feature point set $P_I$ of the first image is obtained; a texture visual word $w_{ti}$ to which each feature point corresponds is calculated according to the codebook $C_I$ of the bag of texture words and the term frequency $TF_{w_{ti}}$ of each texture visual word $w_{ti}$ is calculated, and the specific formula is as follows:

$$TF_{w_{ti}} = \frac{n_{w_{ti}}}{\sum_{tl} n_{tl}},$$

wherein, $n_{w_{ti}}$ represents the number of times that a texture visual word $w_{ti}$ appears in the first image, $\Sigma_{tl} n_{tl}$ represents the number of all the texture visual words in the first image.

Secondly, the weight of an Term Frequency—Inverse Document Frequency (TF-IDF) of each texture visual word $w_{ti}$ in the first image is calculated, specific formula is as follows:

$$TFIDF_{T_{ti}} = TF_{T_{ti}} \times IDF_{w_{ti}}.$$

Finally, a first texture feature vector $v_{texture}=[v_{t1}, v_{t2}, ? \ldots, v_{ti}, \ldots, v_{tK_1}]$ of the first image is obtained, wherein, $v=TFIDF_{w_{ti}}$, $K_1=10000$.

(2) A Method of Extracting a First Color Feature

The present application adopts Color Name feature extraction to extract local color features of a target vehicle in a first image and then utilizes a Bag of Words (BoW) model to quantify the image color features of the target vehicle, so as to obtain a first color feature vector of the first image and use the first color feature vector to represent the first color feature. Detailed steps are as follows.

Step 1: Training The Codebook For A Bag Of Color Words

Firstly, an image set $T=\{I_i\}_N$ of a training vehicle is given. Each image $I_i$ of the training vehicle is roomed in to a uniform size of 64×128. Each image $I_i$ of the training vehicle is partitioned to sub-blocks of a uniform size of 8×8. The average value of RGB of pixels to which each sub-block in each image of the training vehicle corresponds is calculated. A Color Name color feature vector with the length of eleven dimensions is extracted from each sub-block in each image of the training vehicle, and constitutes a color feature set $CN_T$ of the training vehicle.

Secondly, all the training feature points of $CN_T$ are clustered into $K_2$ classes by a k-means cluster algorithm according to a preset codebook size $K_2$, $K_2$ cluster centers obtained after clustering are $K_2$ color visual words $w_{ci}$, the set constituted by $K_2$ color visual words $w_{ci}$ is the codebook $C_2=\{w_{ci}\}_{k_2}$ of the bag of color words, wherein $K_2=350$ is set in the present application.

Finally, IDF weight of each color visual word $w_{ci}$, and the specific formula is as follows:

$$IDF_{w_{ci}} = \log\frac{|T|}{|j: w_{ci} \in I_j|},$$

wherein, $|T|$ is the size of an image set T of a training vehicle, $|j: w_{ci} \in I_j|$ represents the number of images of the training vehicle containing a color visual word $w_{ci}$.

Step 2. Extracting A First Color Feature From The First Image

Firstly, the first image is zoomed in to a size of 64×128, and the first image is partitioned to sub-blocks of a uniform size of 8×8, which are 16 sub-blocks in total. The Color Name color feature vector corresponding to each sub-block is calculated. The color visual word $w_{ci}$ corresponding to each feature vector is calculated according to the codebook $C_2$ of the bag of color word, and the term frequency $TF_{w_{ci}}$ of each color visual word $w_{ci}$ is calculated, and the specific formula is as follows:

$$TF_{w_{ci}} = \frac{n_{w_{ci}}}{\sum_{cl} n_{cl}},$$

wherein $n_{w_{ti}}$ represents the number of times that a color visual word $w_{ti}$ appears in the first image, $\Sigma_{cl} n_{cl}$ represents the number of all the color visual words in the first image.

Secondly, TF-IDF weight of each color visual word $w_{ci}$ in the first image is calculated, and the specific formula is as follows:

$$TFIDF_{w_{ti}} = TF_{w_{ci}} \times IDF_{w_{cI}}.$$

Then, the color feature vector $v_{cn}=[v_{c1}, v_{c2}, ? \ldots, v_{ci}, \ldots, v_{cK_2}]$ of each sub-module is obtained, wherein, $v_{ci}=TFIDF_{w_{ci}}$, $K_2=350$.

Finally, the color feature vectors of 16 sub-modules are sequentially connected, which leads to obtaining a first color feature vector $v_{color}=[v_{cn1}, v_{cn2}, ? \ldots v_{cn16}]$ of the first image, which are 5600 dimensions in total.

(3) A Method of Extracting a First Semantic Attribute Feature

The present application adopts GoogLeNet Convolutional Neural Network model to learn and extract the semantic attribute feature of the first image. The detailed steps are as follows.

Step 1. constructing a GoogLeNet convolutional neural network with Convolution Architecture For Feature Extraction (CAFFE), and initializing the constructed GoogLeNet neural network with trained network parameters in a dataset of a training vehicle;

Step 2. performing forward propagation calculation with the first image as the input image of GoogLeNet;

Step 3. extracting 431-dimension feature vectors from a fully-connected layer of a GoogLeNet neural network as the semantic attribute feature, which can be particularly expressed as $v_{attribute}=[v_{a1}, v_{a2}, ? \ldots, v_{a431}]$.

S103. extracting a second appearance visual feature of the searched vehicle respectively from several second images; wherein, the second images are the images stored in a vehicle monitoring image database.

The searched vehicle refers to a vehicle in a second image stored in a vehicle monitoring image database. Several second images can be all of the images that are stored in a vehicle monitoring image database, or can also be a preset number of images selected from a vehicle monitoring image database.

Similarly to the step S102, the vehicle area of a searched vehicle should be detected from the second image before the execution of step S103, since the second appearance visual feature is directed to the searched vehicle in the second image. Particularly, the method of determining a vehicle area is the same as that in step S102, and thus it will not be described repeatedly here.

It should be noted that each of the second images only contains one searched vehicle by default, since the first image of a target vehicle and the several second images are compared one by one during the vehicle searching process.

Similarly, the second appearance visual feature also mainly comprises a second texture feature, a second color feature and a second semantic attribute feature;

Particularly, the method of extracting a second appearance visual feature of the searched vehicle from each of the second images is identical with the method of extracting a first appearance visual feature from a first image in Step S102, and thus it will not be described repeatedly here.

S104. Calculating an appearance similarity distance between the first image and each of the second images according to the first appearance visual feature and each of the second appearance visual features.

Figure 2:
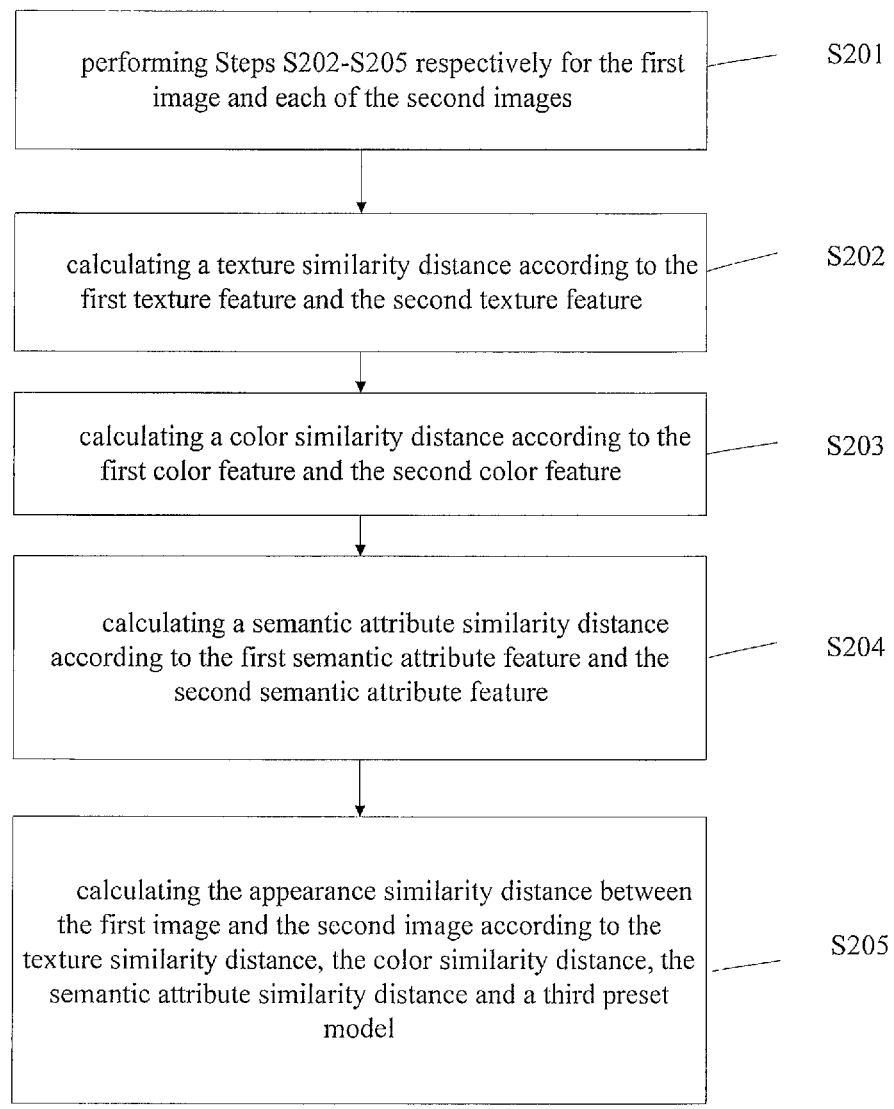
FIG. 2 is a detailed flowchart of step S104 in the embodiment as shown in FIG. 1.

Particularly, when the first appearance visual feature and the second appearance visual feature both comprise three features (i.e., texture, color and semantic attribute features), as shown in FIG. 2, the step of calculating an appearance similarity distance between a first image and each of second images comprises:

S201. performing Steps S202-S205 for the first image and each of the second images respectively;

It can be understood that it is not necessary to limit the execution sequence of Steps 202 to 204 in the present application, i.e., it is possible to execute these three steps in the order of "S202→S203→S204", or in the order of "S204→S203→S202" or simultaneously, which are all reasonable. The execution sequence shown in FIG. 2 is only illustrative and is not intended to limit the execution sequence of Steps 202 to 204.

S202. calculating a texture similarity distance according to the first texture feature and the second texture feature;

S203. calculating a color similarity distance according to the first color feature and the second color feature;

S204. calculating a semantic attribute similarity distance according to the first semantic attribute feature and the second semantic attribute feature;

A person skilled in the art can understand that whether two features are similar can be reflected by the size of an Euclidean distance: a smaller Euclidean distance indicates a greater similarity of two features and a larger Euclidean distance indicates a smaller similarity of two features. Thus, in the present application, the Euclidean distance is used to represent the texture similarity distance, color similarity distance and semantic attribute similarity distance described above and the specific formulas are as follows respectively:

texture similarity distance: $d_{texture}=\|v_{texture}-u_{texture}\|$, wherein, $v_{texture}$ represents a first texture feature vector, $u_{texture}$ represents a second texture feature vector;

color similarity distance: $d_{color}=\|v_{color}-u_{color}\|$, wherein, $v_{color}$ represents a first color feature vector, $u_{color}$ represents a second color feature vector;

semantic attribute similarity distance: $d_{attribute}=\|v_{attribute}-u_{attribute}\|$, wherein, $v_{attribute}$ represents a first semantic attribute feature vector, $u_{attribute}$ represents a second semantic attribute feature vector.

S205. calculating the appearance similarity distance between the first image and the second image according to the texture similarity distance, the color similarity distance, the semantic attribute similarity distance and a third preset model;

wherein, the third preset model is: $D_{appearance}=\alpha \times d_{texture}+\beta \times d_{color}+(1-\alpha-\beta) \times d_{attribute}$, wherein, $D_{appearance}$ is the appearance similarity distance, $d_{texture}$ is the texture similarity distance, $d_{color}$ is the color similarity distance, $d_{attribute}$ is the semantic attribute similarity distance, $\alpha$ and $\beta$ are empirical weights.

It can be understood that linear summation is actually carried out in Step S205 with the third preset model according to different weights for three similarity distances calculated in Steps S202-S204, that is to fuse the similarity distances so as to comprehensively reflect the appearance similarity between the first image and the second image by three appearance features, i.e., texture, color and semantic attribute features. Such method of comprehensively reflecting the appearance similarity between a first image and a second image by the similarity distances of three appearance features allows to reflect the similarity between a first image and a second image more accurately and in turn to improve the accuracy of vehicle searching.

It should be noted that the above-mentioned method of calculating an appearance similarity distance between a first image and a second image is only a preferable illustrative method and is not unique, other methods capable of calculating an appearance similarity distance are also applicable to the present application.

S105. selecting several images from the several second images as several third images;

There are many kinds of methods for selecting several images from the several second images as several third images, and three methods are listed as examples below.

The first method: obtaining a second search result of a target vehicle by arranging the several second images in an ascending order of the appearance similarity distances; then determining several images that rank before a first threshold value in the second search result as several third images.

Wherein, the first threshold value can be a definite positive integer, or can also be a percentage.

Particularly, when the first threshold value is a definite positive integer, for example, 500, it means to determine the several second images that rank in the top 500 in the second search result as several third images. When the first threshold value is a percentage, for example 20%, it means to determine the several second images that rank in the top 20% in the second search result as several third images.

The second method: determining the several second images, whose appearance similarity distance with the first image is smaller than a third threshold, as several third images.

Wherein, the third threshold can be set empirically, e.g. the third threshold can be set to 0.5 and thus the several second images whose appearance similarity distances with the first image are smaller than 0.5 are determined as several third images.

The third method: determining all of the several second images as several third images, or determining a part of the several second images as several third images.

S106. determining a first license plate area in the first image and a second license plate area in each of the third images;

The method of determining a target vehicle area in a first image and each of the third images is identical with the method of determining a target vehicle area in a first image, both belong to the prior art and thus will not be described in detail here.

It should be noted that the first image must contain a license plate area due to the fact that the first image is usually obtained by manual selection from video frames of a monitoring video or is obtained by taking pictures. Although the third images are also from surveillance videos, it is not possible to ensure that each of the third images comprises a license plate area in practical applications. This is because that the third images are normally not selected manually due to the huge number of the third images. In addition, this is also because a vehicle cannot be photographed in all directions since the position of a camera filming a surveillance video is fixed. Further, during the execution of Step S106, a license plate area may not be determined in a third image, which is reasonable. For the particular processing steps when no license plate areas are detected, please refer to Step S108.

S107. obtaining a first license plate feature corresponding to the first license plate area and a second license plate feature corresponding to each of the second license plate areas by inputting the first license plate area and each of the second license plate areas respectively into a preset Siamese neural network model;

The Siamese neural network model is a neural network model combining a convolutional neural network with a metric learning method.

Figure 3:
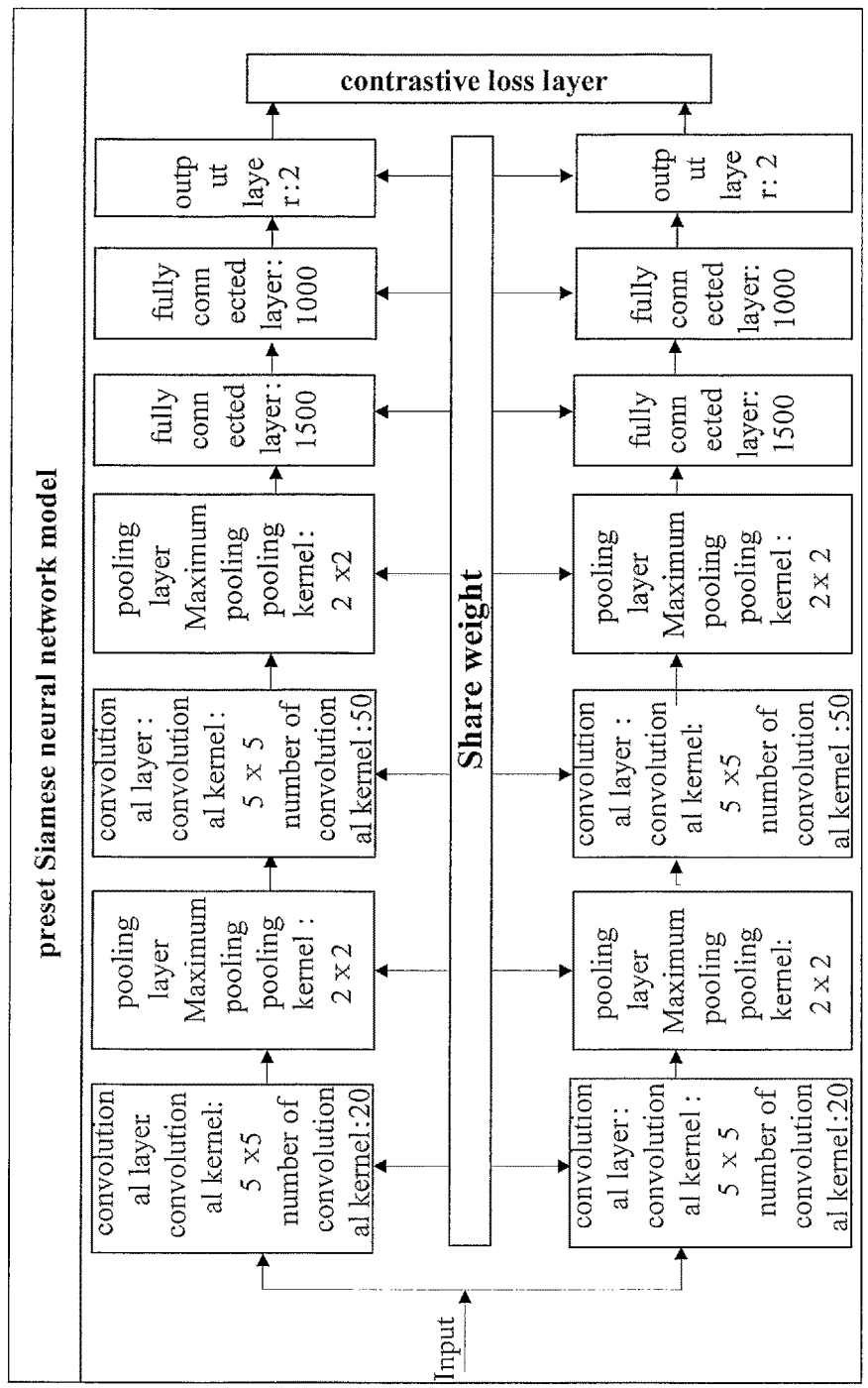
FIG. 3 is a schematic structural diagram of a Siamese neural network model used in the first embodiment of the present application.

As shown in FIG. 3, a preset Siamese neural network model used in the present application consists of two sets of convolutional and pooling layers, three sets of fully-connected layers and a contrastive loss layer, wherein each set of convolutional layers, pooling layers, and fully-connected layers shares weight respectively. For the particular parameters of each layer, please refer to FIG. 3.

The above preset Siamese neural network model is obtained by training via the following steps.

Step 1. Preparing The Training Data

A set of images of a training license plate is given. A pair of images are composed by two images of the license plate in the set randomly. The same license plates are labeled as 1 and different license plates are labeled as 0. A total number of 50000 pairs of images are composed respectively for the above two types of image pairs of the license plate, and these image pairs are converted into a LMDB data format for training.

Step 2. Constructing A Siamese Neural Network

Figure 4:
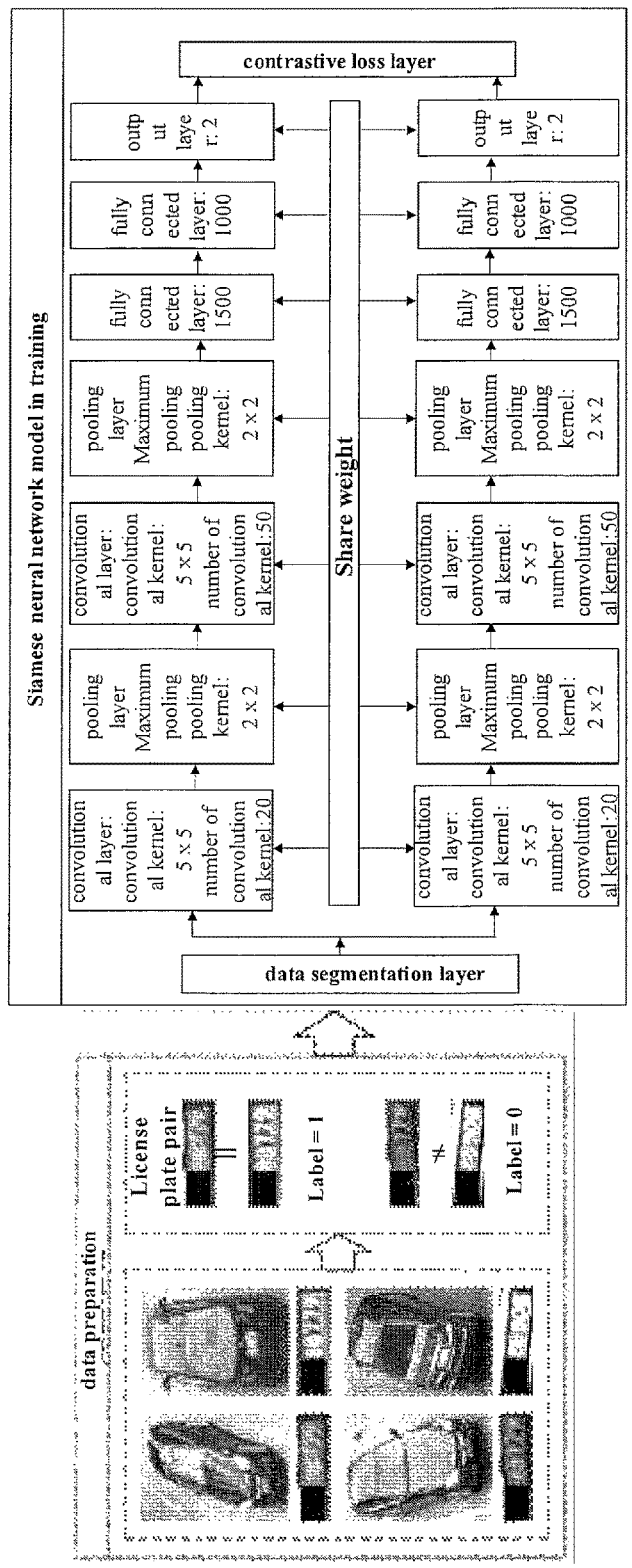
FIG. 4 is a schematic diagram illustrating the training process of the Siamese neural network model used in the first embodiment of the present application.

A Siamese neural network is constructed with Convolution Architecture For Feature Extraction (CAFFE) according to the layered structure and parameters of a Siamese neural network as shown in FIG. 4, wherein the Siamese neural network comprises, from left to right, a data segmentation layer, two sets of convolutional and pooling layers, three sets of fully-connected layers and a contrastive loss layer. Gauss random initialization with the average of zero is performed for the weight of each layer.

Step 3. Training A Siamese Neural Network Model

As shown in FIG. 4, taking 50000 pairs of images and labels of a training license plate as the input of a Siamese neural network, the Siamese neural network model is trained with a stochastic gradient descent method. The weight of each layer after 100000 times of iterations is stored, which completes the training of a Siamese neural network model.

The present inventors, after a large number of experiments, have proved that the 1000-dimension feature vectors of the second fully-connected layer in the preset Siamese neural network model as shown in FIG. 3 can reflect the characteristics of a license plate well. Thus, in the present application, the 1000-dimension feature vectors of the second fully-connected layer as shown in FIG. 3 are taken as license plate features.

Further, the first license plate feature $v_{plate}$ corresponding to a first license plate area of a first image can be obtained by inputting the first license plate area into the preset Siamese neural network model in FIG. 3.

Similarly, when a license plate area is present in a third image, the second license plate feature $u_{plate}$ corresponding to a second license plate area of the third image can be obtained by inputting the determined second license plate area into the preset Siamese neural network model.

As mentioned in step S106, since there may be no license plate areas in some third images, when there are no license plate areas in a third image, it is possible to not extract the second license plate feature corresponding to this third image temporarily.

S108. calculating a license plate feature similarity distance between the first image and each of the third images according to the first license plate feature and each of the second license plate features;

Similarly to the calculation of an appearance similarity distance in Step S104, an Euclidean distance is used to represent the license plate feature similarity distance between the first image and each of the third images.

Particularly, the step of calculating a license plate feature similarity distance between the first image and each of the third images comprises:

calculating a license plate feature similarity distance between the first image and each of the third images with a fourth preset model; wherein, the fourth preset model is $D_{plate}=\|v_{plate}-u_{plate}\|$, wherein, $D_{plate}$ is the license plate feature similarity distance, $v_{plate}$ is a first license plate feature, $u_{plate}$ is a second license plate feature.

Optionally, when no license plate areas are present in a third image, the license plate feature similarity distance between the first image and the third image can be set to a constant $\delta_{plate}$, the value of $\delta_{plate}$ is the maximum value of license plate feature similarity distances between the first image and all of the third images in which a license plate area is present.

It can be understood that a smaller license plate feature similarity distance $D_{plate}$ indicates a greater similarity between the first license plate feature and the second license plate feature, and the corresponding first image and third image are more similar to each other.

Further, it should be noted that when applying the corresponding license plate features of a first image and each of third images determined by a Siamese neural network model, it is only necessary to input the determined license plate areas in the first image and each of the third images into the preset Siamese neural network model, and then the corresponding license plate features can be obtained. Thus, compared to the existing vehicle searching method based on license plate recognition at accesses in constrained scenes, the methods provided by the present application are not limited by application scenes. The methods provided by the present application reduce the requirements of hardware such as cameras that collect images of a vehicle and auxiliary devices, simplifies the extraction process of license plate features and in turn improves the vehicle searching efficiency.

S109. calculating a visual similarity distance between the first image and each of the third images according to the appearance similarity distance and the license plate feature similarity distance;

Particularly, the step of calculating a visual similarity distance between the first image and each of the third images comprises:

calculating a visual similarity distance between the first image and each of the third image with a fifth preset model; wherein, the fifth preset model is: $D_{visual}=\gamma \times D_{appearance}+(1-\gamma)\times D_{plate}$, wherein, $D_{visual}$ is the visual similarity distance, $D_{appearance}$ is the appearance similarity distance, $D_{plate}$ is the license plate feature similarity distance, $\gamma$ is an empirical weight. In the present application, $\gamma=0.4$.

S110. obtaining a first search result of the target vehicle by arranging the several third images in an ascending order of the visual similarity distances.

Similarly, it can be understood that a smaller visual similarity distance indicates a greater similarity of a first image and a third image and indicates that the target vehicle is more similar to the searched vehicle in the third image.

Compared to the prior art, in the vehicle searching method provided by the first embodiment of the present application, on the one hand, the fusion features of three appearance features (i.e., texture, color and semantic attribute features) are used to represent the appearance visual features of a first image and each of second images, which makes the calculated appearance similarity distance between the first image and each of the second images more accurate and thus leads to a higher searching accuracy of the vehicle searching method provided by the present application. On the other hand, corresponding license plate features of the first image and each of the third images are determined with a Siamese neural network model instead of a traditional vehicle recognition method, such that the vehicle searching method provided by the present application is not limited by application scenes, which leads to an improved vehicle searching speed while reducing requirements of hardware such as cameras that collect images of a vehicle and the auxiliary devices. More importantly, the vehicle searching method provided by the present application determines, comprehensively, the visual similarity distance between the first image and each of the third images according to two parameters, i.e., appearance and visual similarity distances, which leads to a higher searching accuracy of the vehicle searching method provided by the present application.

Moreover, if the third images are determined in Step S105 by the first method, since the second search result is firstly obtained by means of appearance features of a vehicle and the images that rank before a first threshold value in the second search result are determined as third images in the first embodiment, which narrows the searching range, then the third images are rearranged according to the visual similarity distance which takes into account the license plate feature and the appearance feature comprehensively, and the first search result is obtained by accurately searching, within a small range, vehicles that are similar to the target vehicle, thus, vehicle searching methods provided by the first embodiment of the present application, in addition to achieving the beneficial effects above, can further improve the search speed and accuracy.

Embodiment 2

Figure 5:
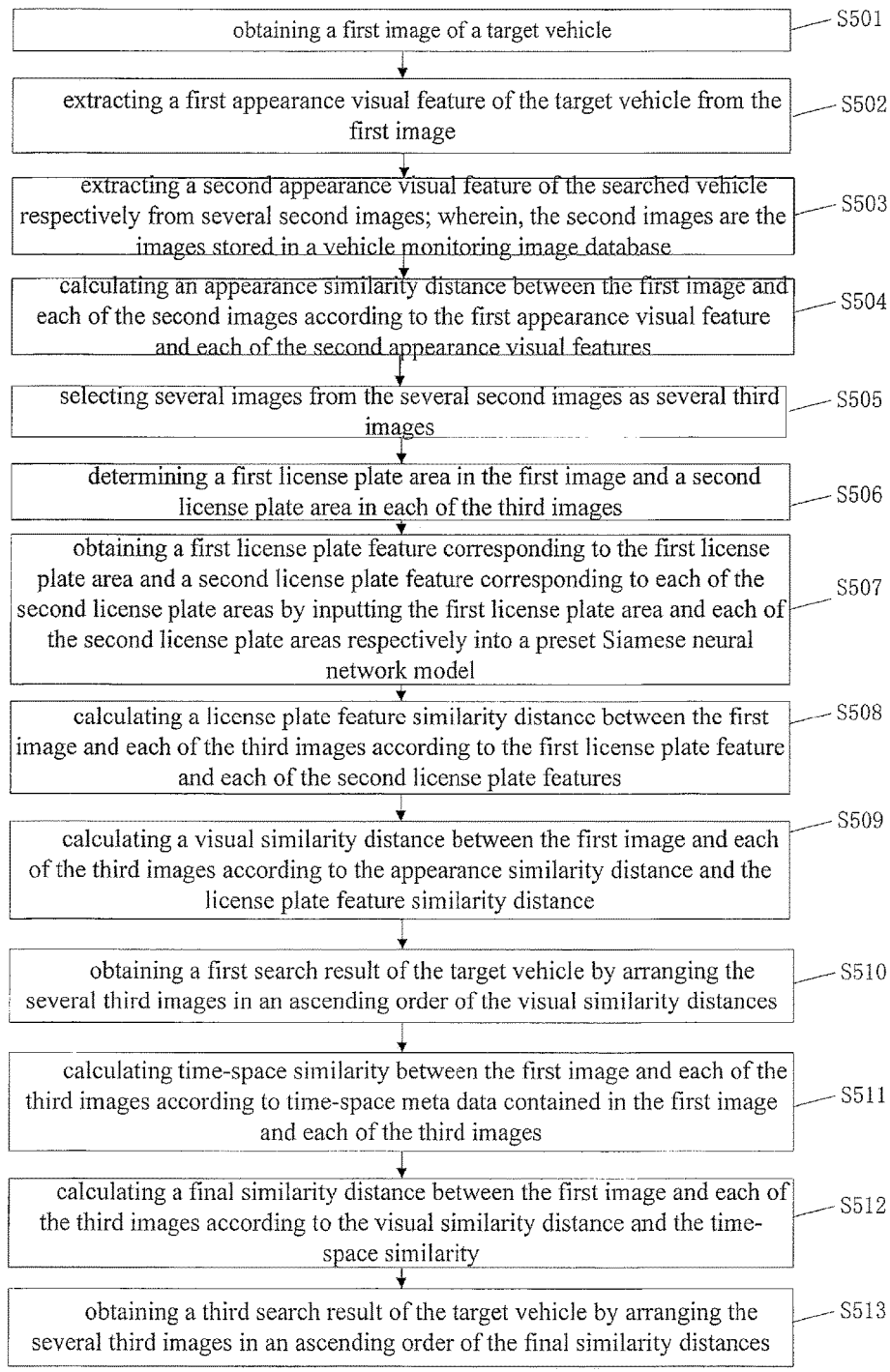
FIG. 5 is a flowchart of another vehicle searching method provided by the second embodiment of the present application.

Based on the vehicle searching method provided by the first embodiment of the present application, as shown in FIG. 5, the second embodiment of the present application further provides another vehicle searching method, which comprises:

S501 to S510;

It should be noted that the specific contents of Steps S501 to S510 are correspondingly identical to those of Steps S101 to S110 in the first embodiment respectively, thus no more description will be made to Steps S501 to S510 herein and the corresponding content can refer to the first embodiment.

S511. calculating time-space similarity between the first Image and each of the third mages according to time-space meta data contained in the first image and each of the third images;

wherein, the time-space meta data refers to information about time and location at which the corresponding images are taken.

Particularly, the time-space similarity between the first image and each of the third images is calculated with a first preset model, wherein, the first preset model is:

$$ST(i, j) = \frac{|T_i - T_j|}{T_{max}} \times \frac{\delta(C_i, C_j)}{D_{max}},$$

wherein, ST (i, j) is the time-space similarity, $T_i$ is the time at which the first image is taken, $T_j$ is the time at which the third image is taken, $\delta(C_i, C_j)$ is the distance between a camera $C_i$ taking the first image and a camera $C_j$ taking the third image, $T_{max}$ is the maximum value of absolute values of the differences between the time at which the first image is taken and the time at which all of the several third images are taken, $D_{max}$ is the maximum value of distances between the camera taking the first image and the camera taking each of the several third images.

S512. calculating a final similarity distance between the first image and each of the third images according to the visual similarity distance and the time-space similarity;

Particularly, the final similarity distance between the first image and each of the third images is calculated with a second preset model; wherein, the second preset model is $D=D_{visual} \times ST(i, j)$, wherein, D is the final similarity distance, $D_{visual}$ is the visual similarity distance.

S513. obtaining a third search result of the target vehicle by arranging the several third images in an ascending order of the final similarity distances.

It should be noted that in the present embodiment, step S511 can be executed after the competition of Step S509 and it can be executed after the competition of Step S510. The execution sequence shown in FIG. 5 is only one of execution sequences and cannot particularly limit the execution sequence of Step S511.

The vehicle searching method provided by the second embodiment of the present application can, in addition to possessing the advantageous effects of the vehicle searching method provided by the first embodiment, further improve the accuracy of vehicle searching since it further takes into account the influence of time and space factors on the similarity distance between the first image and each of the third images.

Embodiment 3

Based on the first embodiment described above, embodiments of the present application further provide another vehicle searching method, which differs from the vehicle searching method provided by the first embodiment in that it further comprises:

Step 1. Determining several images that rank before a second threshold value in the first search result as several fourth images;

wherein, the second threshold value can be a definite positive integer, or can also be a percentage.

Particularly, when the second threshold value is a definite positive integer, e.g., 300, it means to determine the several images that rank in the top 300 in the first search result as several fourth images. When the second threshold value is a percentage, e.g., 30%, it means to determine the several second images that rank in the top 30% in the first search result as several third images. Moreover, when subsequent steps are performed only for the fourth images, the search range can be reduced, and the search speed can be increased.

Step 2. calculating time-space similarity between the first image and each of the fourth images according to time-space meta data contained in the first image and each of the fourth images;

wherein, the definition of the time-space meta data and the method of calculating space-time similarity are both identical with those in the second embodiment and will not be described repeatedly here.

Step 3. calculating a final similarity distance between the first image and each of the fourth images according to the visual similarity distance and the time-space similarity.

Particularly, the method of calculating the final similarity distance is identical with that in the second embodiment and will not be described repeatedly here.

Step 4. obtaining a fourth search result of the target vehicle by arranging the several fourth images in an ascending order of the final similarity distance.

In addition to the advantageous effects achieved by the method provided by the first embodiment, by applying the vehicle searching method provided by the third embodiment, the search speed and accuracy can further be improved. This is due to the fact that in the third embodiment the first search result is firstly obtained by means of appearance features and license plate features of a vehicle and the images that rank before a second threshold value are determined in the first search result, which narrows the searching range; then the several fourth images are rearranged according to the final similarity distance which further takes into account the time and space information of the images of the searched vehicle, and the fourth search result is obtained by accurately searching, within a small range, vehicles that are similar to the target vehicle.

Optionally, based on any one of the embodiments described above, a vehicle searching method provided by embodiments of the present application can further comprise:

outputting the search results to a user, such that the user is able to visually observe the search results.

In the first embodiment, the search result is the first search result and/or the second search result.

In the second embodiment, the search result is at least one of the first search result, the second search result and the third search result.

In the third embodiment, the search result is at least one of the first search result, the second search result and the fourth search result.

The validity of the vehicle searching methods provided by the embodiments of the application has been verified through experiments in the present application, and the specific verification process and results are as follows:

(1) Determining An Experiment Dataset

High-definition video data with a time length of 24 hours are collected from a real urban surveillance scene, and a video with a length of about 1 hour from 16:00:00 to 16:59:59 is selected as the experiment video set and then converted to a video frame sequence by average sampling at 5 frames per second. A vehicle dataset containing 50000 images of a license plate and 776 vehicles with different plate numbers is determined based on the above video frames, and the appearance of a same vehicle in different cameras is marked, in addition, the color, brand, model, license plate location, license plate characters and other information of a vehicle are also marked.

(2) Setting Parameters

The experiment dataset is divided into a training set that comprises 576 vehicles and 37778 images, and a testing set that comprises 200 vehicles and 11579 second images. One image is selected for each testing vehicle at each camera to constitute a first image set, the first image set comprises 1678 first images in total.

During the experiment, the images of the training set are used to train the codebook of the bag of texture words, the codebook of the bag of color words, GoogLeNet neural network and Siamese neural network. All the second images of the testing set are searched using each first image in the first image set and the search results are arranged in an ascending order of the similarity. The performances of various searching methods are evaluated using inAP, HIT@1 and HIT@5 in the experiment.

(3) Experiment Results

In the experiment, five searching methods are compared in total, which in particular are:

Method 1: vehicle searching only using color features;

Method 2: vehicle searching only using semantic attribute features;

Method 3: vehicle searching with fused texture, color and semantic attribute features;

Method 4: vehicle searching using the vehicle searching method provided by the first embodiment of the present application;

Method 5: vehicle searching using the vehicle searching method provided by the second embodiment of the present application.

Table 1 lists the evaluation results of evaluating the searching performances of the above five searching methods using the above three evaluation methods of mAP, HIT@1 and HIT@5 respectively.

TABLE 1

| Method   | mAP   | HIT@1 | HIT@5 |
|----------|-------|-------|-------|
| Method 1 | 12.20 | 33.91 | 53.69 |
| Method 2 | 17.04 | 49.82 | 71.16 |
| Method 3 | 18.49 | 50.95 | 73.48 |
| Method 4 | 25.88 | 61.08 | 77.41 |
| Method 5 | 27.77 | 61.44 | 78.78 |

It can be seen from Table 1 that the search results of Method 1 and Method 2, which use a single appearance feature to determine the similarity of the first image and each of the second images, are poor and it is difficult for a single feature to effectively describe the appearance feature of a vehicle. Method 3 incorporates a plurality of appearance features and obtains better search results, which reflects advantages of a plurality of appearance features capable of comprehensively and complementarily describing the appearance of a vehicle. Method 4 incorporates appearance and license plate features, and obtains better search results, which proves that the license plate area and license plate feature matching method can improve the accuracy of vehicle searching. Since Method 5 further incorporates the time-space similarity on the basis of Method 4, the searching accuracy is further improved and better search effects are obtained, which fully proves the validity of the searching method provided by the third embodiment of the present application.

Corresponding to the above embodiments of the method, the present application further provides a vehicle searching device. Descriptions will be made for each embodiment below with combination of specific embodiments.

Embodiment 4

Figure 6:
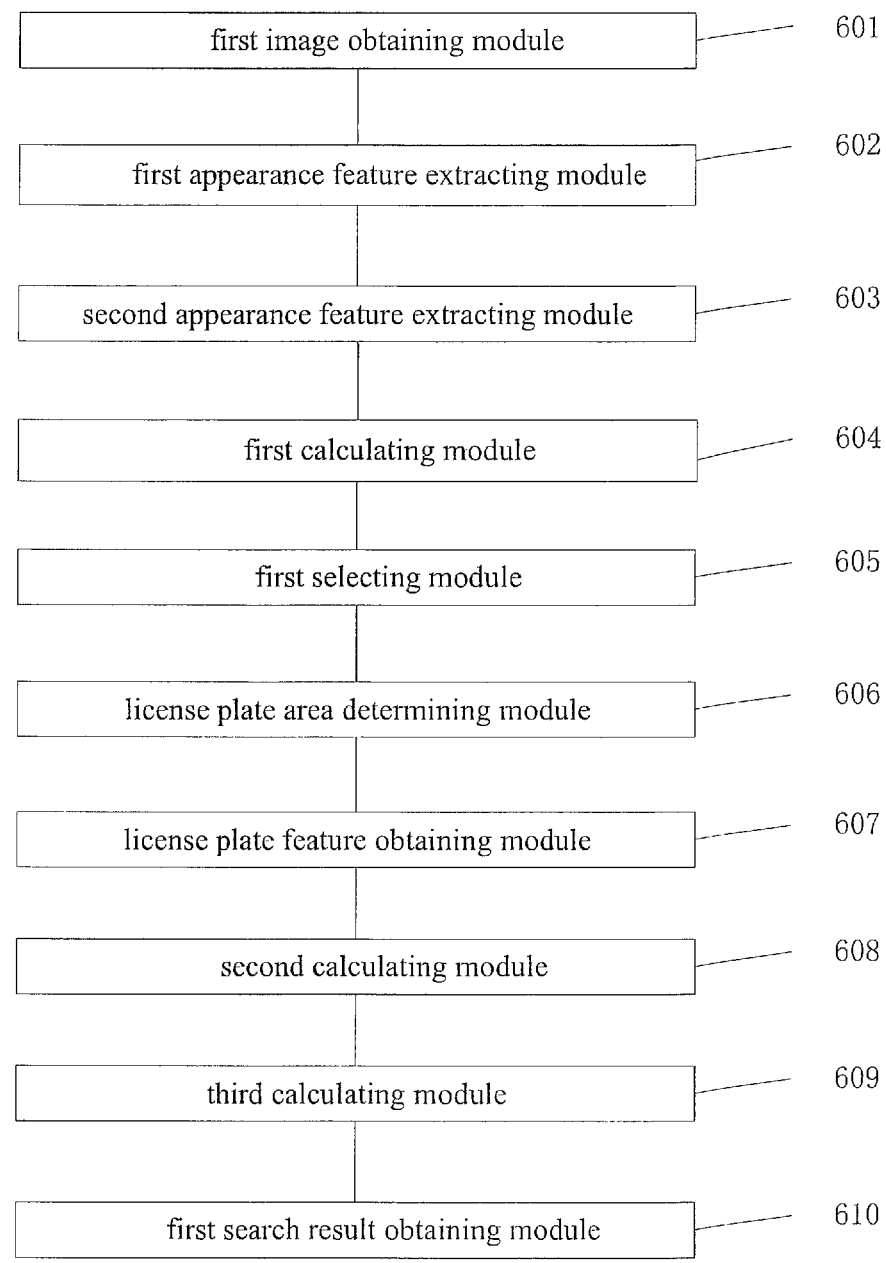
FIG. 6 is a schematic structural diagram of a vehicle searching device provided by the fourth embodiment of the present application.

The vehicle searching device provided by the fourth embodiment of the present application comprises a processor, coupled to a memory, that executes or facilitates execution of executable modules, the executable modules, as shown in FIG. 6, comprising a first image obtaining module 601, a first appearance feature extracting module 602, a second appearance feature extracting module 603, a first calculating module 604, a first selecting module 605, a license plate area determining module 606, a license plate feature obtaining module 607, a second calculating module 608, a third calculating module 609 and a first search result obtaining module 610.

The first image obtaining module 601 is used for obtaining a first image of a target vehicle.

The first image of a target vehicle can be taken from a surveillance video, or can be obtained by taking pictures.

It should be noted that the license plate area of a target vehicle must be included in the first image of the target vehicle so as to carry out the subsequent extraction and comparison of license plate features.

The first appearance feature extracting module 602 is used for extracting a first appearance visual feature of the target vehicle from the first image.

Since the first appearance visual feature is directed to the target vehicle in the first image, the target vehicle area should be detected from the first image before triggering the first appearance feature extracting module 602.

Particularly, the method of determining a target vehicle area in a first image belongs to the prior art, and will not be described here.

Wherein, the first appearance visual features mainly comprise a first texture feature, a first color feature and a first semantic attribute feature. The extraction of a first appearance visual feature from a first image refers to the extraction of a first texture feature, a first color feature and a first semantic attribute feature from a first image.

Particularly, the specific method of extracting these three features from a first image is identical with that in the first embodiment, and it will not be described repeatedly here.

The second appearance feature extracting module 603 is used for extracting a second appearance visual feature of the searched vehicle respectively from several second images; wherein, the second images are the images stored in a vehicle monitoring image database;

the searched vehicle refers to a vehicle in a second image stored in a vehicle monitoring image database. The several second images can be all the images that are stored in a vehicle monitoring image database, or can be a preset number of images selected from a vehicle monitoring image database.

Since the second appearance visual feature is directed to the searched vehicle in a second image, the searched vehicle area should be detected from the second image before triggering the second appearance feature extracting module 603. Particularly, the method of determining a vehicle area is identical with that in the first embodiment, and thus it will not be described repeatedly here.

It should be noted that each of the second images only contains one searched vehicle by default, since the first image of a target vehicle and the several second images are compared one by one during the vehicle searching process.

Similarly, the second appearance visual feature comprises a second texture feature, a second color feature and a second semantic attribute feature.

Particularly, the method of extracting a second appearance visual feature of the searched vehicle from each of the second images is identical with the method of extracting a first appearance visual feature from a first image in the first appearance feature extracting module 602, and thus it will not be described repeatedly here.

The first calculating module 604 is used for calculating an appearance similarity distance between the first image and each of the second images according to the first appearance visual feature and each of the second appearance visual features.

Figure 7:
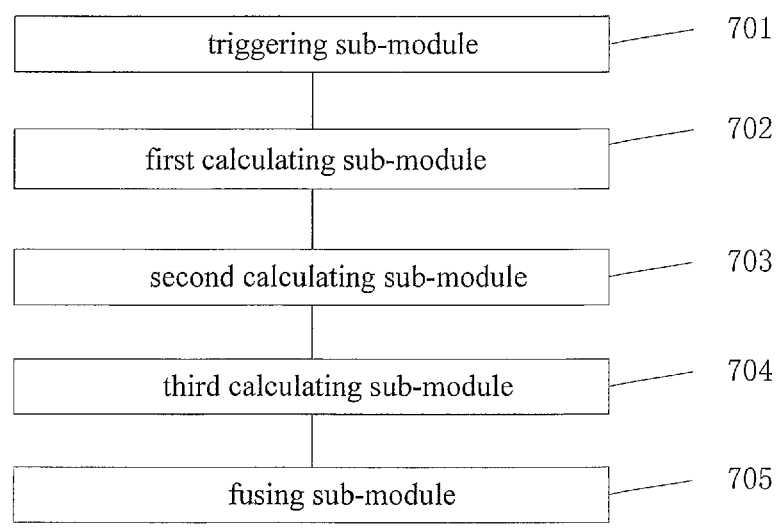
FIG. 7 is a detailed schematic structural diagram of a module 104 in the vehicle searching device provided by the fourth embodiment of the present application.

Particularly, when the first appearance visual feature and the second appearance visual feature both comprise three features, i.e., texture, color and semantic attribute features, as shown in FIG. 7, the first calculating module comprises a triggering sub-module 701, a first calculating sub-module 702, a second calculating sub-module 703, a third calculating sub-module 704 and fusing sub-module 705.

It can be understood that it is not necessary to limit the connection sequence of these three sub-modules 702, 703 and 704 in the present application, i.e., it is possible to connect these sub-modules in the order of "701-702-703-704-705", or in the order of "701-704-703-702-705", which are both reasonable. The connection sequence shown in FIG. 7 is only illustrative and it is not intended to limit the connection sequence of 702, 703 and 704.

The triggering sub-module 701 is used for triggering the first calculating sub-module 702, the second calculating sub-module 703, the third calculating sub-module 704 and the fusing sub-module 705 once for the first image and each of the second images respectively.

The first calculating sub-module 702 is used for calculating a texture similarity distance according to the first texture feature and the second texture feature.

The second calculating sub-module 703 is used for calculating a color similarity distance according to the first color feature and the second color feature.

The third calculating sub-module 704 is used for calculating a semantic attribute similarity distance according to the first semantic attribute feature and the second semantic attribute feature.

A person skilled in the art can understand that, whether two features are similar can be reflected by the size of an Euclidean distance, a smaller Euclidean distance indicates a greater similarity of two features and a larger Euclidean distance indicates a smaller similarity of two features. Thus, in the present application, the Euclidean distance is used to represent the texture similarity distance, color similarity distance and semantic attribute similarity distance described above and the specific formulas are as follows respectively:

the texture similarity distance: $d_{texture} = \|v_{texture} - u_{texture}\|$, wherein $v_{texture}$ represents a first texture feature vector, and $u_{texture}$ represents a second texture feature vector;

the color similarity distance: $d_{color} = \|v_{color} - u_{color}\|$, wherein, $v_{color}$ represents a first color feature vector, and $u_{color}$ represents a second color feature vector;

the semantic attribute similarity distance: $d_{attribute} = \|v_{attribute} - u_{attribute}\|$, wherein, $v_{attribute}$ represents a first semantic attribute feature vector, and $u_{attribute}$ represents a second semantic attribute feature vector.

The fusing sub-module 705 is used for calculating the appearance similarity distance between the first image and the second image according to the texture similarity distance, the color similarity distance, the semantic attribute similarity distance and a third preset model.

Wherein, the third preset model is $D_{appearance} = \alpha \times d_{texture} + \beta \times d_{color} + (1-\alpha-\beta) \times d_{attribute}$, wherein, physical meanings of various parameters are identical with those in the first embodiment, and will not be described repeatedly here.

It can be understood that linear summation is actually carried out by the third calculating sub-module 704 with a third preset model according to different weights for three similarity distances calculated in the sub-modules 702 to 704, that is to fuse the similarity distances, so as to comprehensively reflect the appearance similarity between the first image and the second image by three appearance features, i.e., texture, color and semantic attribute features. Such method of comprehensively reflecting the appearance similarity between a first image and a second image by the similarity distances of three appearance features allows to reflect the similarity between a first image and a second image more accurately and thus also improve the accuracy of vehicle searching.

It should be noted that the method of calculating an appearance similarity distance between a first image and a second image is only a preferable illustrative method and is not unique, other methods capable of calculating an appearance similarity distance are also applicable to the present application.

The first selecting module 605 is used for selecting several images from the several second images as several third images.

The first selecting module 605 can select several images from the several second images as several third images by several methods, and three methods are listed as examples below.

The first method: the first selecting module 605 can comprise a second search result obtaining sub-module and a third image determining sub-module.

The second search result obtaining sub-module is used for obtaining the second search result of the target vehicle by arranging the several second images in an ascending order of the appearance similarity distances.

The third image determining sub-module is used for determining several images that rank before a first threshold value in the second search result as several third images.

Wherein, the first threshold value can be a determined positive integer, and it can also be a percentage.

The second method: the first selecting module 605 can be used specifically for determining the several second images whose appearance similarity distance with the first image is smaller than a third threshold, as several third images.

Wherein, the third threshold can be set empirically, e.g. the third threshold can be set to 0.5 and thus the several second images whose appearance similarity distances with the first image is smaller than 0.5 are determined as several third images.

The third method: determining all of the several second images as several third images, or determining a part of the several second images as several third images.

The license plate area determining module 606 is used for determining a first license plate area in the first image and a second license plate area in each of the third images.

The method of determining a license plate area in a first image and each of the third images is identical with the method of determining a target vehicle area in a first image, both belong to the prior art and thus it will not be described in detail here.

It should be noted that the first image must contain a license plate area due to the fact that the first image is usually obtained by manual selection from video frames of a monitoring video or is obtained by taking pictures. Although the third images are also from surveillance videos, it is not possible to ensure that each of the third images comprises a license plate area in practical applications. This is because the third images are normally not selected manually one by one due to the huge number of the third images. In addition, this is also because a vehicle cannot be photographed in all directions since the position of a camera filming a surveillance video is fixed. Further, during the operation of module 606, a license plate area may not be determined in a third image, which is reasonable. For the particular processing methods when no license plate areas are detected, please refer to the module 608.

The license plate feature obtaining module 607 is used for obtaining a first license plate feature corresponding to the first license plate area and a second license plate feature corresponding to each of the second license plate areas by inputting the first license plate area and each of the second license plate areas respectively into a preset Siamese neural network model.

The Siamese neural network model is a neural network model combining a convolutional neural network with a metric learning method.

As shown in FIG. 3, the preset Siamese neural network model in the present application consists of two sets of convolutional and pooling layers, three sets of fully-connected layers and a contrastive loss layer, wherein each set of convolutional layers, pooling layers, and fully-connected layers shares weight respectively. For the particular parameters of each layer, please refer to FIG. 3.

The preset Siamese neural network model described above is obtained by training through the following training steps, and the specific training process can refer to the first embodiment and will not be described repeatedly here.

The present inventors, after a large number of experiments, have proved that the 1000-dimension feature vectors of the second fully-connected layer in the preset Siamese neural network model shown in FIG. 3 can reflect the characteristics of a license plate well. Thus, in the present application the 1000-dimension feature vectors of the second fully-connected layer shown in FIG. 3 are taken as license plate features.

Further, the first license plate feature $v_{plate}$ corresponding to a first license plate area of a first image can be obtained by inputting the first license plate area into the preset Siamese neural network model.

Similarly, when a license plate area is present in a third image, the second license plate feature $u_{plate}$ corresponding to a second license plate area of the third image can be obtained by inputting the determined second license plate area into the preset Siamese neural network model.

As mentioned for the license plate area determining module 606, since there may be no license plate areas in some third images, when there are no license plate areas in a third image, it is possible to not extract the second license plate feature corresponding to this third image temporarily.

The second calculating module 608 is used for calculating a license plate feature similarity distance between the first image and each of the third images according to the first license plate feature and each of the second license plate features.

Particularly, the second calculating module 608 can calculate a license plate feature similarity distance between the first image and each of the third images with a fourth preset module.

Wherein, the fourth preset module is:

$D_{plate}=\|v_{plate}-u_{plate}\|$, wherein, $D_{plate}$ is the license plate feature similarity distance, $v_{plate}$ is the first license plate feature, $u_{plate}$ is the second license plate feature.

Optionally, when no license plate areas are present in a second image, the license plate feature similarity distance between the first image and the third image can be set to a constant $\delta_{plate}$, the value of $\delta_{plate}$ is the maximum value of license plate feature similarity distances between the first image all of the third images and the first image in which a license plate area is present.

It can be understood that a smaller license plate feature similarity distance $D_{plate}$ indicates a greater similarity between the first license plate feature and the second license plate feature and the corresponding first image and the third image are more similar to each other.

Further, it should be noted that when applying the corresponding license plate feature of a first image and each of third images determined by a Siamese neural network model, it is only necessary to input the determined license plate areas in the first image and each of third images into the preset Siamese neural network model, and then the corresponding license plate feature can be obtained. Thus, compared to the existing vehicle searching method based on license plate recognition at access in constrained scenes, the device provided by the present application are not limited by application scenes, reduces the requirements of hardware such as cameras that collect images of a vehicle and the auxiliary devices, simplifies the extraction process of license plate features and thus improves the vehicle searching efficiency.

The third calculating module 609 is used for calculating a visual similarity distance between the first image and each of the third images according to the appearance similarity distance and the license plate feature similarity distance.

Particularly, the third calculating module 609 can calculate a visual similarity distance between the first image and each of the third images with a fifth preset model.

Wherein, the fifth preset module is:

$D_{visual}=\gamma \times D_{appearance}+(1-\gamma)\times D_{plate}$, wherein, physical meanings of various parameters are identical with those in the first embodiment, and will not be described repeatedly here.

The first search result obtaining module 610 is used for obtaining the first search result of the target vehicle by arranging the several third images in an ascending order of the visual similarity distances.

Similarly, It can be understood that a smaller visual similarity distance indicates a larger similarity of a first image and a third image and it also means that the target vehicle is more similar to the searched vehicle in the third image.

Compared to the prior art, in the vehicle searching device provided by the fourth embodiment of the present application, on the one hand, the fusion features of three appearance features (i.e., texture, color and semantic attribute features) are used to represent the appearance visual features of a first image and each of second images, which makes the calculated appearance similarity distance between a first image and each of second images more accurate and thus leads to a higher searching accuracy of the vehicle searching device provided by the present application. On the other hand, corresponding license plate features of the first image and each of the third images are determined with a Siamese neural network model instead of a traditional vehicle recognition device, such that the vehicle searching device provided by the present application is not limited by application scenes, which leads to an improved vehicle searching speed while reducing requirements of hardware such as cameras that collect images of a vehicle and the auxiliary devices. More importantly, the vehicle searching device provided by the present application determines, comprehensively, the visual similarity distance between the first image and each of the third images according to two parameters, i.e., appearance and license plate feature similarity distances, which leads to a higher searching accuracy of the vehicle searching device provided by the present application.

Moreover, if the third images are determined by the module 605 with the first method, since the second search result is firstly obtained by means of appearance features of a vehicle, and the images that rank before a first threshold value in the second search result are determined as third images, which narrows the searching range; then the third images are rearranged according to a visual similarity distance which takes into account license plate features and appearance features comprehensively, and the first search result is obtained by accurately searching, within a small range, vehicles that are similar to the target vehicle. Thus, vehicle searching device provided by the fourth embodiment of the present application, in addition to achieving the beneficial effects above, can further improve the search speed and accuracy.

Embodiment 5

Figure 8:
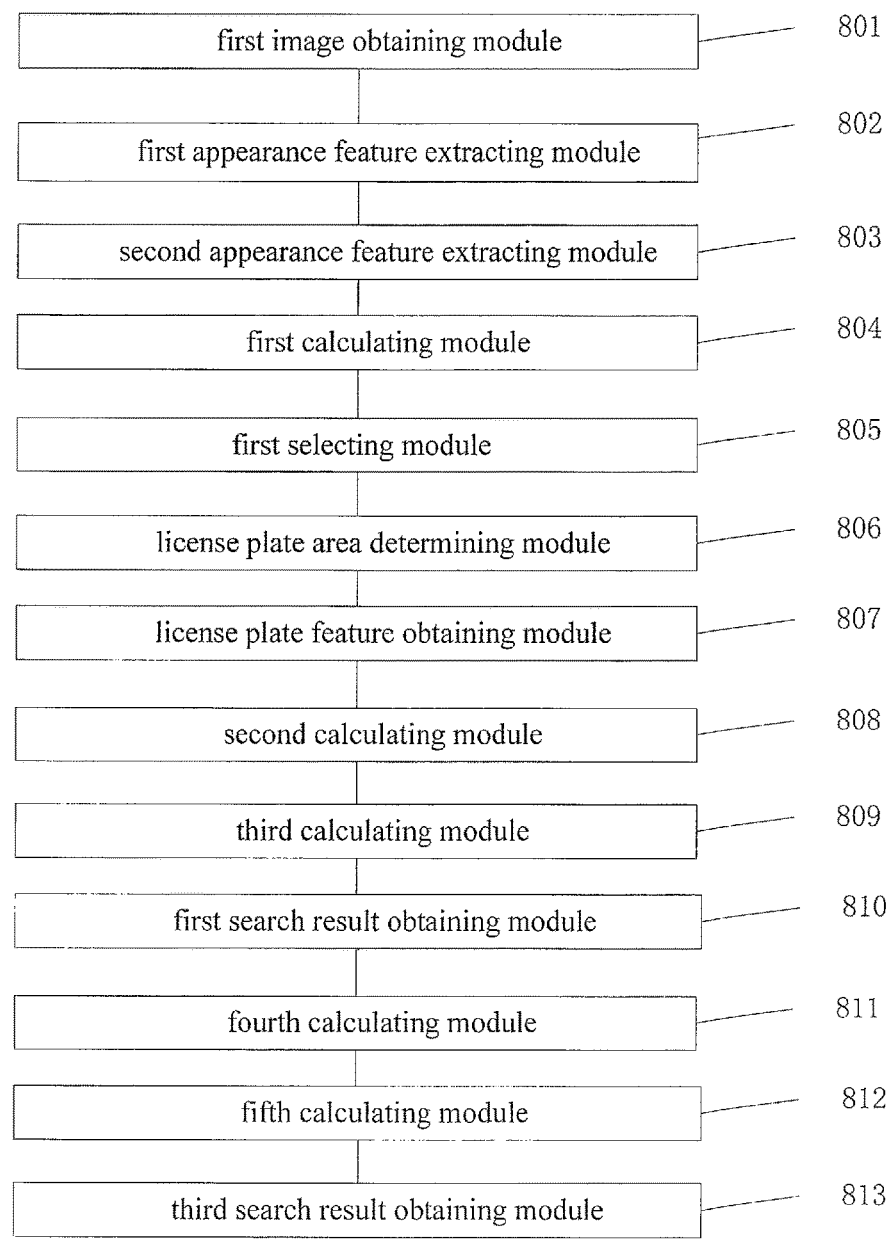
FIG. 8 is a schematic structural diagram of another vehicle searching device provided by the fifth embodiment of the present application.

Based on the vehicle searching device provided by the fourth embodiment described above, as shown in FIG. 8, the fifth embodiment of the present application further provides another vehicle searching device. The another vehicle searching device of the fifth embodiment comprises a processor, coupled to a memory, that executes or facilitates execution of executable modules. In addition to a first image obtaining module 801, a first appearance feature extracting module 802, a second appearance feature extracting module 803, a first calculating module 804, a first selecting module 805, a license plate area determining module 806, a license plate feature obtaining module 807, a second calculating module 808, a third calculating module 809 and a first search result obtaining module 810, the executable modules further comprises a fourth calculating module 811, a fifth calculating module 812 and a third search result obtaining module 813.

Wherein, the functions of modules 801 to 810 are correspondingly identical with those of modules 601 to 610 in the fourth embodiment and will not be described repeatedly here in the sake of brevity.

The fourth calculating module 811 is used for calculating, after the module 809 or 810 is triggered, time-space similarity between the first image and each of the third images according to time-space meta data contained in the first image and each of the third images.

Particularly, the fourth calculating module 811 is used for calculating time-space similarity between the first image and each of the third images with a first preset model, wherein, the first preset model is:

$$ST(i, j) = \frac{|T_i - T_j|}{T_{max}} \times \frac{\delta(C_i, C_j)}{D_{max}},$$

wherein, physical meanings of various parameters are identical with those in the first embodiment, and will not be described repeatedly here.

The fifth calculating module 812 is used for calculating a final similarity distance between the first image and each of the third images according to the visual similarity distance and the time-space similarity.

Particularly, the fifth calculating module 812 is used for calculating a final similarity distance between the first image and each of the third images with a second preset model.

Wherein, the second preset module is:

$D=D_{visual} \times ST(i, j)$, wherein, D is the final similarity distance, $D_{visual}$ is the visual similarity distance.

The third search result obtaining module 813 is used for obtaining a third search result of a target vehicle by arranging the several third images in an ascending order of the final similarity distances.

It should be noted that in the present embodiment, the module 811 can be connected after the module 809 or after the module 810, the connection sequence shown in FIG. 5 is only one of connection sequences and cannot limit the particular execution sequence of the module 811.

The vehicle searching device provided by the fifth embodiment of the present application can, in addition to possessing the advantageous effects of the vehicle searching device provided by the fourth embodiment, finther improve the accuracy of vehicle searching since it further takes into account the influence of time and space factors on similarity distance between the first image and each of the second images.

Embodiment 6

Based on the fourth embodiment described above, embodiments of the present application further provide another vehicle searching device. The another vehicle searching device provided by the sixth embodiment comprises a processor, coupled to a memory, that executes or facilitates execution of executable modules, the executable modules further comprising a second selecting module, a sixth calculating module, a seventh calculating module and a fourth search result obtaining module.

The second selecting module is used for determining several images that rank before a second threshold value in the first search result as several fourth images.

Wherein, the second threshold value can be a definite positive integer, and can also be a percentage.

Particularly, when the second threshold value is a definite positive integer, e.g., 300, it means to determine the several images that rank in the top 300 in the first search result as several fourth images. When the second threshold value is a percentage, e.g., 30%, it means to determine the several second images that rank in the top 30% in the first search result as several third images. Moreover, when the subsequent steps are performed only for the fourth images, the search range can be reduced, and the search speed can be improved.

The sixth calculating module is used for calculating time-space similarity between the first image and each of the fourth images according to time-space meta data contained in the first image and each of the fourth images.

Wherein, the definition of time-space meta data and the method of calculating space-time similarity are both identical with those in the fourth embodiment and will not be described repeatedly here.

The seventh calculating module is used for calculating a final similarity distance between the first image and each of the fourth images according to the visual similarity distance and the time-space similarity.

Particularly, the method of calculating a final similarity distance is identical with that in the fourth embodiment and will not be described repeatedly here.

The fourth search result obtaining module is used for obtaining a fourth search result of the target vehicle by arranging the several fourth images in an ascending order of the final similarity distances.

In addition to achieve the beneficial effects which the device provided by the fourth embodiment, by applying the vehicle searching device provided by the sixth embodiment of the present application, the search speed and accuracy can be further improved. This is due to the fact that in the sixth embodiment, the first search result is firstly obtained by means of appearance and license plate features of a vehicle, and the images that rank before a second threshold value are determined in the first search result, which narrows the searching range; then the several fourth images are rearranged according to the final similarity distance which further takes into account the time and space information of images of the searched vehicle, and the fourth search result is obtained by accurately searching, within a small range, vehicles that are similar to the target vehicle.

Optionally, the executable modules executed by the processor of the vehicle searching device provided by any one of the embodiments of a device can further comprise:

an outputting module, for outputting the search results to a user, such that the user is able to visually observe the search results.

In the fourth embodiment, the search result is the first search result and/or the second search result. In the fifth embodiment, the search result is at least one of the first search result, the second search result and the third search result. Tn the sixth embodiment, the search result is at least one of the first search result, the second search result and the fourth search result.

The description of the embodiments of a device is quite brief since the embodiments of a device are essentially similar with the embodiments of a method, and reference can be made to the parts in the description of the embodiments of method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the terming "comprise(s) a/an . . . " do not exclude that there are additional identical elements in the processes, methods, articles, or devices, which comprise the listed elements.

Various embodiments in the description are all described in a corresponding manner, Reference to each other can be made for the same or similar parts between various embodiments and the description of each embodiment focuses on the differences between them. In particular, the description of the embodiments of a system is quite brief since the embodiments of a device are essentially similar with the embodiments of a method, and reference can be made to the parts in the description of the embodiments of method.

The embodiments described above are just preferable embodiments of the present application, and are not intended to limit the protection scope of the present application. Any modifications, equivalent alternatives, improvements or the like within the spirit and principle of the present application are included in the protection scope of the present application.

What is claimed is:

1. A vehicle searching method, characterized in that it comprises:
    obtaining a first image of a target vehicle;
    extracting a first appearance visual feature of the target vehicle from the first image;
    extracting a second appearance visual feature of the searched vehicle respectively from several second images; wherein, the second images are the images stored in a vehicle monitoring image database;
    calculating an appearance similarity distance between the first image and each of the second images according to the first appearance visual feature and each of the second appearance visual features;
    selecting several images from the several second images as several third images;
    determining a first license plate area in the first image and a second license plate area in each of the third images;
    obtaining a first license plate feature corresponding to the first license plate area and a second license plate feature corresponding to each of the second license plate areas by inputting the first license plate area and each of the second license plate areas respectively into a preset Siamese neural network model;
    calculating a license plate feature similarity distance between the first image and each of the third images according to the first license plate feature and each of the second license plate features;
    calculating a visual similarity distance between the first image and each of the third images according to the appearance similarity distance and the license plate feature similarity distance;
    obtaining a first search result of the target vehicle by arranging the several third images in an ascending order of the visual similarity distances;

wherein, the first appearance visual feature comprises a first texture feature, a first color feature and a first semantic attribute feature;
    the second appearance visual feature comprises a second texture feature, a second color feature and a second semantic attribute feature;
    the step of calculating an appearance similarity distance between the first image and each of the second images according to the first appearance visual feature and each of the second appearance visual features, comprises:
    performing the following steps for the first image and each of the second images respectively:
    calculating a texture similarity distance according to the first texture feature and the second texture feature;
    calculating a color similarity distance according to the first color feature and the second color feature;
    calculating a semantic attribute similarity distance according to the first semantic attribute feature and the second semantic attribute feature;
    calculating the appearance similarity distance between the first image and the second image according to the texture similarity distance, the color similarity distance, the semantic attribute similarity distance and a third preset model; wherein, the third preset model is:
    $D_{appearance} = \alpha \times d_{texture} + \beta \times d_{color} + (1-\alpha-\beta) \times d_{attribute}$, wherein, $D_{appearance}$ is the appearance similarity distance, $d_{texture}$, is the texture similarity distance, $d_{color}$ is the color similarity distance, $d_{attribute}$ is the semantic attribute similarity distance, and are empirical weights.

2. The method according to claim 1, characterized in that, the step of selecting several images from the several second images as several third images, comprises:
    obtaining a second search result of the target vehicle by arranging the several second images in an ascending order of the appearance similarity distances;
    determining several images that rank before a first threshold value in the second search result as the several third images.

3. The method according to claim 1, characterized in that, after the step of calculating a visual similarity distance between the first image and each of the third images, the method further comprises:
    calculating time-space similarity between the first image and each of the third images according to time-space meta data contained in the first image and each of the third images;
    calculating a final similarity distance between the first image and each of the third images according to the visual similarity distance and the time-space similarity;
    obtaining a third search result of the target vehicle by arranging the several third images in an ascending order of the final similarity distances.

4. The method according to claim 1, characterized in that it further comprises:
    determining several images that rank before a second threshold value in the first search result as several fourth images;
    calculating time-space similarity between the first image and each of the fourth images according to time-space meta data contained in the first image and each of the fourth images;
    calculating a final similarity distance between the first image and each of the fourth images according to the visual similarity distance and the time-space similarity;

obtaining a fourth search result of the target vehicle by arranging the several fourth images in an ascending order of the final similarity distances.

5. The method according to claim 2, characterized in that it further comprises:
   determining several images that rank before a second threshold value in the first search result as several fourth images;
   calculating time-space similarity between the first image and each of the fourth images according to time-space meta data contained in the first image and each of the fourth images;
   calculating a final similarity distance between the first image and each of the fourth images according to the visual similarity distance and the time-space similarity;
   obtaining a fourth search result of the target vehicle by arranging the several fourth images in an ascending order of the final similarity distances.

6. The method according to claim 3, characterized in that, the step of calculating time-space similarity between the first image and each of the third images comprises:
   calculating the time-space similarity between the first image and each of the third images with a first preset model, wherein, the first preset model is:

$$ST(i, j) = \frac{|T_i - T_j|}{T_{max}} \times \frac{\delta(C_i, C_j)}{D_{max}},$$

wherein, ST (i, j), $T_i$ is the time-space similarity, $T_i$ is the shooting time at which the first image is taken, $T_j$ is the shooting time at which the third image is taken, $\delta(C_i, C_j)$ is the distance between a camera $C_i$ taking the first image and a camera $C_j$ taking the third images, $T_{max}$ is the maximum value of absolute values of the differences between the time at which the first image is taken and the time at which all of the several third images are taken, $D_{max}$ is the maximum value of distances between the camera taking the first image and the cameras taking each third image of the several third images.

7. The method according to claim 1, characterized in that, the step of calculating a final similarity distance between the first image and each of the third images comprises:
   calculating the final similarity distance between the first image and each of the third images with a second preset model, wherein, the second preset model is: $D=D_{visual} \times ST (i, j)$, wherein, D is the final similarity distance, $D_{visual}$ is the visual similarity distance.

8. The method according to claim 1, characterized in that, the step of calculating a visual similarity distance between the first image and each of the third images comprises:
   calculating the visual similarity distance between the first image and each of the third images with a fifth preset model, wherein, the fifth preset model is:
   $D_{visual} = \gamma \times D_{appearance} + (1-\gamma) \times D_{plate}$, wherein, $D_{visual}$ is the visual similarity distance, $D_{appearance}$ is the appearance similarity distance, $D_{plate}$ is the license plate feature similarity distance, $\gamma$ is an empirical weight.

9. A vehicle searching device, characterized in that it comprises a processor, coupled to a memory, that executes or facilitates execution of executable modules, the executable modules comprising:
   a first image obtaining module for obtaining a first image of a target vehicle;
   a first appearance feature extracting module for extracting a first appearance visual feature of the target vehicle from the first image;
   a second appearance feature extracting module for extracting a second appearance visual feature of the searched vehicle respectively from several second images; wherein, the second images are the image stored in a vehicle monitoring image database;
   a first calculating module, for calculating an appearance similarity distance between the first image and each of the second images according to the first appearance visual feature and each of the second appearance visual features;
   a first selecting module for selecting several images from the several second images as several third images;
   a license plate area determining module, for determining a first license plate area in the first image and a second license plate area in each of the third images;
   a license plate feature obtaining module, for obtaining a first license plate feature corresponding to the first license plate area and a second license plate feature corresponding to each of the second license plate areas by inputting the first license plate area and each of the second license plate areas respectively into a preset Siamese neural network model;
   a second calculating module, for calculating a license plate feature similarity distance between the first image and each of the third images according to the first license plate feature and each of the second license plate features;
   a third calculating module, for calculating a visual similarity distance between the first image and each of the third images according to the appearance similarity distance and the license plate feature similarity distance;
   a first search result obtaining module, for obtaining a first search result of the target vehicle by arranging the several third images in an ascending order of the visual similarity distances;
   wherein, the first appearance visual feature comprises a first texture feature, a first color feature and a first semantic attribute feature;
   the second appearance visual feature comprises a second texture feature, a second color feature and a second semantic attribute feature;
   the step of calculating an appearance similarity distance between the first image and each of the second images according to the first appearance visual feature and each of the second appearance visual features, comprises:
   performing the following steps for the first image and each of the second images respectively:
   calculating a texture similarity distance according to the first texture feature and the second texture feature;
   calculating a color similarity distance according to the first color feature and the second color feature;
   calculating a semantic attribute similarity distance according to the first semantic attribute feature and the second semantic attribute feature;
   calculating the appearance similarity distance between the first image and the second image according to the texture similarity distance, the color similarity distance, the semantic attribute similarity distance and a third preset model; wherein, the third preset model is:
   $D_{appearance} = \alpha \times d_{texture} + \beta \times d_{color} + (1-\alpha-\beta) \times d_{attribute}$, wherein, $D_{appearance}$ is the appearance similarity distance, $d_{texture}$ is the texture similarity distance, $d_{color}$ is the color similarity distance, $d_{attribute}$ is the semantic attribute similarity distance, and are empirical weights.

10. The device according to claim 9, characterized in that the executable modules further comprises:
   a fourth calculating module, for calculating, after the third calculating module is triggered, time-space similarity between the first image and each of the third images according to time-space meta data contained in the first image and each of the third images;
   a fifth calculating module, for calculating a final similarity distance between the first image and each of the third images according to the visual similarity distance and the time-space similarity;
   a third search result obtaining module, for obtaining a third search result of the target vehicle by arranging the several third images in an ascending order of the final similarity distances.

* * * * *